United States Patent [19]

Aritake

[11] 4,447,485
[45] May 8, 1984

[54] ADHESIVE TAPE AND PROCESS FOR ITS PRODUCTION

[75] Inventor: Toshiyuki Aritake, Nagahama, Japan

[73] Assignee: Mitsubishi Plastics Industries Limited, Tokyo, Japan

[21] Appl. No.: 397,237

[22] Filed: Jul. 12, 1982

[30] Foreign Application Priority Data

Aug. 4, 1981 [JP] Japan ............................ 56-122294
Aug. 10, 1981 [JP] Japan ............................ 56-125129
Oct. 5, 1981 [JP] Japan ............................ 56-158439
Nov. 30, 1981 [JP] Japan ............................ 56-192052

[51] Int. Cl.$^3$ ............................................. B32B 5/16
[52] U.S. Cl. ................................... 428/144; 428/150; 428/213; 428/220; 428/330; 428/331; 428/354; 428/355; 428/212; 428/323
[58] Field of Search ............... 428/144, 145, 150, 354, 428/330, 331, 213, 220, 355, 212, 323

[56] References Cited

FOREIGN PATENT DOCUMENTS

667331 7/1963 Canada ................................ 428/354

*Primary Examiner*—Alexander Thomas
*Attorney, Agent, or Firm*—Oblon, Fisher, Spivak, McClelland & Maier

[57] ABSTRACT

An adhesive tape comprises a base sheet of a polypropylene resin, an adhesive layer formed on one side of the base sheet and a roughened surface layer formed on the other side of the base sheet and composed of a polypropylene resin containing fine inorganic filler particles, in which the roughened surface layer has a thickness of not more than the maximum particle diameter of said fine inorganic filler particles and is substantially free from voids or cracks, and the total percent light transmittance of the tape is at least 90%. Such an adhesive tape is produced by a process which comprises forming an adhesive layer on one side of a base sheet of a polypropylene resin and a surface layer of a polypropylene resin having a melting point lower than that of the polypropylene resin of the base sheet and containing fine inorganic filler particles, on the other side of the base sheet to obtain an unstretched laminated sheet, and then stretching the laminated sheet at a temperature of at least the melting point of the polypropylene resin of the surface layer to bring the thickness of the surface layer to be not more than the maximum particle diameter of said fine inorganic filler particles.

8 Claims, 5 Drawing Figures

ADHESIVE TAPE AND PROCESS FOR ITS PRODUCTION

BACKGROUND OF THE INVENTION

1. Field of the Invention

The present invention relates to an adhesive tape having excellent writability and photostatic property and a process for its production.

2. Description of the Prior Art

An adhesive tape of this type is generally called a mending adhesive tape and useful for mending e.g. drawings. The mending adhesive tape is required to be writable by e.g. a pencil (hereinafter referred to as "writability") and tearable by fingers in the transverse direction of the tape (hereinafter referred to as "finger-tearability") and to have excellent light transmittance so as to permit photostatic reproduction therethrough (hereinafter referred to as "photostatic property").

Heretofore, in order to improve primarily the writability and finger-tearability among the required properties for a mending adhesive tape, it has been proposed to incorporate fine inorganic filler particles in the base sheet of an adhesive tape, and such a tape is actually commercially available. However, in such a tape, light scattering is likely to be caused by the inorganic filler particles per se or by voids or cracks formed at the interface between the inorganic filler particles and the base sheet resin, and the total percent light transmittance of the tape tends to be thereby reduced. Thus, such a tape is inferior in the photostatic property and is not suitable as a mending adhesive tape.

SUMMARY OF THE INVENTION

It is an object of the present invention to overcome the above mentioned drawbacks of the conventional adhesive tape and to provide an adhesive tape having excellent writability and photostatic property required for a mending adhesive tape.

Another object of the present invention is to provide a process for producing such a superior adhesive tape.

Namely, the present invention provides an adhesive tape comprising a base sheet of a polypropylene resin, an adhesive layer formed on one side of the base sheet and a roughened surface layer formed on the other side of the base sheet and composed of a polypropylene resin containing fine inorganic filler particles, in which the roughened surface layer has a thickness of not more than the maximum particle diameter of said fine inorganic filler particles and is substantially free from voids or cracks, and the total percent light transmittance of the tape is at least 90%.

Such an adhesive tape is produced by a process which comprises forming an adhesive layer on one side of a base sheet of a polypropylene resin and a surface layer of polypropylene resin having a melting point lower than that of the polypropylene resin of the base sheet and containing fine inorganic filler particles, on the other side of the base sheet to obtain an unstretched laminated sheet, and then stretching the laminated sheet at a temperature of at least the melting point of the polypropylene resin of the surface layer to bring the thickness of the surface layer to be not more than the maximum particle diameter of said fine inorganic filler particles.

Other objects or features of the present invention will be apparent from the following detailed description of the preferred embodiments of the present invention.

DETAILED DESCRIPTION OF THE INVENTION

The polypropylene resin to be used for the base sheet may be an isotactic polypropylene commonly used in films and may also be a copolymer of a propylene with other α-olefin. In order to obtain good finger-tearability, it is preferred to use a mixture of a polypropylene with a methylpentene polymer. The mixture is preferably composed of from 95 to 50% by weight of a polypropylene and from 5 to 50% by weight of a methylpentene polymer. If the proportions are outside the above ranges, the finger-tearability tends to be inferior. The methylpentene polymer should preferably have a Vicat softening point (as measured by JIS K-7206) lower than the melting point of the polypropylene to obtain good transparency of the base sheet. The methylpentene polymer may also be a copolymer with a small amount of other α-olefin.

A roughened surface layer composed of a polypropylene resin containing fine inorganic filler particles is formed on one side of the base sheet to provide excellent writability. The polypropylene resin used for the roughened surface layer has a melting point lower than the polypropylene resin used for the base sheet. As such a resin, there may be mentioned a copolymer of proplene with other α-olefin such as ethylene. The fine inorganic filler particles may be those commonly used as inorganic fillers for plastics, such as calcium carbonate or clay. It is preferred that the fine inorganic filler particles have a maximum particle diameter of about 10μ, and they are capable of forming a roughened surface having a maximum roughness of at most 10μ and an average roughness of 10 points of from 2.0 to 6.0μ as measured by JIS B-0601.

It is preferred that the roughened surface layer is composed of from 90 to 50% by weight of the polypropylene resin and from 10 to 50% by weight of the fine inorganic filler particles.

In order to obtain good writability, it is important that the roughened surface layer has a thickness of not more than the maximum particle diameter of the fine inorganic filler particles. In order to ensure the desired transparency and to obtain a good photostatic property, it is also important that the roughened surface does not contain internal voids or cracks. Such a roughened surface layer can be advantageously formed by the process which will be described hereinafter.

A paper surface to be mended by an adhesive tape is usually deglazed, and accordingly, in order to obtain a satisfactory photostat copy on which the configuration of the affixed tape is scarcely reproduced or copied, it is desired that the surface of the adhesive tape is likewise deglazed as far as possible (hereinafter referred to as "non-glossiness"). Therefore, the "good non-glossiness" means that the relative specular glossiness is small and the specular reflection of light on the surface is minimum. In order to impart the non-glossiness to the adhesive tape, a specific thermoplastic resin may preferably be incorporated in the roughened surface layer.

Figure 1:
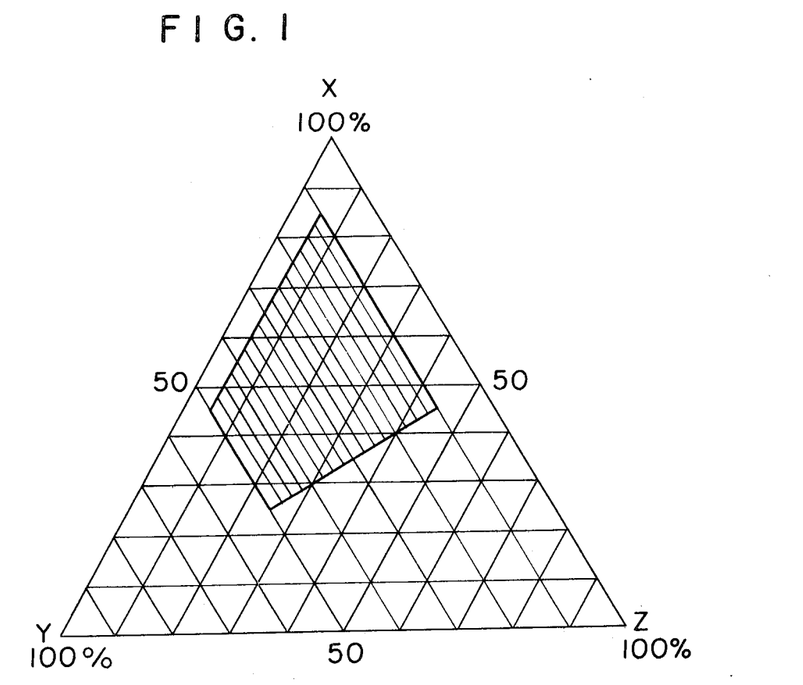
FIG. 1 is a diagram showing the composition of the roughened surface layer in which the effective ranges of the components constituting the roughened surface layer are indicated by oblique lines.

According to a preferred embodiment as illustrated in FIG. 1, the roughened surface layer is composed of from 25 to 85% by weight of a polypropylene resin (X), from 10 to 50% by weight of fine inorganic filler particles (Y) and from 5 to 45% by weight of one or more thermoplastic resins (Z) selected from the group consisting of a methylpentene polymer, a polystyrene, a polyalkyl methacrylate and a polyester, provided that the total of the components (X), (Y) and (Z) is always 100% and the amount of the component (Z) is not more than the amount of the component (X), whereby the relative specular glossiness of the roughened surface layer is not more than 30%.

If the component (X) is less than 25% by weight, voids or cracks are likely to form which impair the photostitic property. On the other hand, if the component (X) exceeds 85% by weight, the writability will be inferior.

If the component (Y) (i.e. fine inorganic filler particles) is less than 10% by weight, the writability will be inferior, and if it exceeds 50% by weight, the photostatic property will be inferior.

Referring to the specific thermoplastic resin (Z), the methylpentene polymer may be the same resin as used in the base sheet. As the polyester, there may be mentioned polyethylene terephthalate or polybutylene terephthalate. The polystyrene may be a so-called modified polystyrene wherein a small amount of a carboxylic acid anhydride or its derivative is incorporated. The component (Z) is incorporated within a range of from 5 to 45% by weight. If it is less than 5% by weight, the non-glossiness will be inadequate, and if it is more than 45% by weight, the photographic property will be inferior. Further, the amount of the component (Z) must be not more than the amount of the component (X). If the component (Z) exceeds the amount of the component (X), voids or cracks are likely to form.

The relationship among the amounts of the respective components (X), (Y) and (Z) is illustrated in FIG. 1, wherein the effective ranges of the components are shown by oblique lines.

It is desirable that an adhesive tape can easily be cut straight in the transverse direction by fingers or by a dispenser cutter (i.e. a tape cutter). It is frequently experienced that an adhesive tape is torn obliquely at an intermediate portion of its width depending upon the force applied to cut or tear it by a dispenser cutter or fingers.

It has now been found possible to obtain the straight transverse tearability or severability and to avoid the undesirable oblique tearing, by forming a crystalline polypropylene layer on one side or each side of the polypropylene/a methylpentene polymer mixture layer of the base sheet.

Namely, according to the preferred embodiments of the invention illustrated in FIGS. 2 to 5, the base sheet comprises a main layer (A) composed of from 95 to 50% by weight of a polypropylene and from 5 to 50% by weight of a methylpentene polymer and a subsidiary layer (B) formed on one side or each side of the main layer (A) and composed of a crystalline polypropylene having a melting point of at least the Vicat softening point of said methylpentene polymer, and a bonding layer (D) of a carboxylic acid-modified polypropylene is interposed between the base sheet and the adhesive layer. In FIGS. 2 to 5, symbol (C) designates the roughened surface layer.

The main layer (A) of the base sheet is composed of a resin mixture of the polyproylene and the methylpentene polymer i.e. poly-4-methyl-pentene-1, in the above specified ratio. The polypropylene to be used for this main layer (A) (hereinafter referred to as "A-layer PP") is a propylene homopolymer or a propylene copolymer containing a small amount of a copolymerized component, and it may be the one commonly used as a starting material for films. The methylpentene polymer, which may be a copolymer with a small amount of other α-olefin, is preferably the one having a Vicat softening point (as measured by JIS K-7206) lower than the melting point of the A-layer PP to obtain good transparency of the main layer (A). As mentioned above, it is preferred to mix from 95 to 50% by weight of the A-layer PP and from 5 to 50% by weight of the methylpentene polymer. If the mixing ratio is outside these ranges, the tape thereby obtained tends to be hardly torn by fingers.

Figure 2:
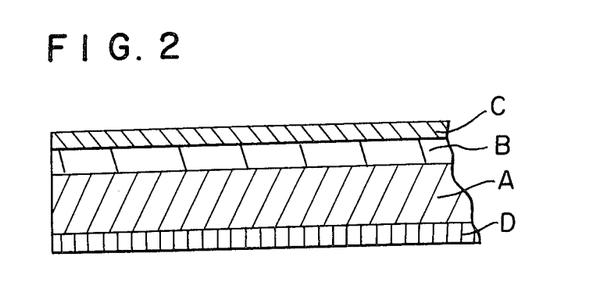
FIGS. 2 to 5 are diagrammatic cross sectional views of adhesive tapes according to the present invention, wherein the adhesive layer is omitted.
Figure 3:
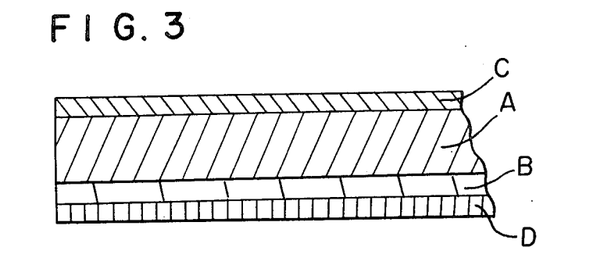
Figure 4:
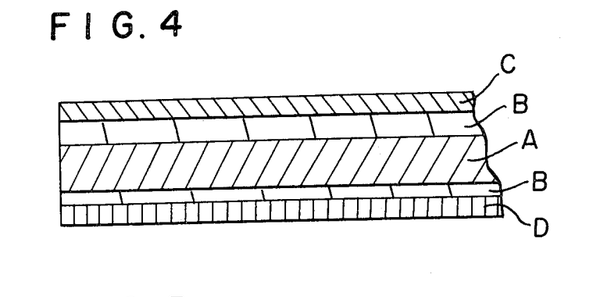
Figure 5:
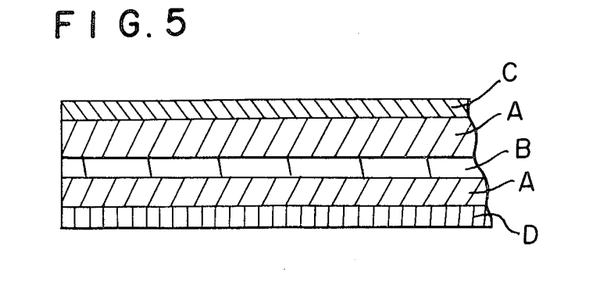

In order to improve the severability by a dispenser cutter, a crystalline polypropylene layer (B) is formed on one side or each side of the main layer (A) as shown in FIGS. 2 to 4 or as an intermediate layer between two main layers (A) as shown in FIG. 5. As the crstyalline polypropylene (hereinafter referred to as "B-layer PP") constituting this layer (B), there may be used a propylene homopolymer, a propylene copolymer containing a small amount (i.e. not more than about 3% by weight) of a copolymerized component (e.g. ethylene), or a carboxylic acid-modified polypropylene prepared by grafting thereto a carboxylic acid. The B-layer PP may be the same as the A-layer PP. In order to improve the severability or tearability, it is necessary that the B-layer PP has a melting point of at least the Vicat softening point of the above mentioned methylpentene polymer. If the melting point is less than the Vicat softening point, no improvement of the severability by a dispenser cutter is obtainable. Namely, as will be described in detail hereinafter, the stretching temperature for the preparation of the adhesive tape according to the present invention is determined by the Vicat softening point of the methylpentene polymer in the main layer (A), and the stretching can most advantageously be carried out at a temperature of at least said softening point and at most the melting point of the A-layer PP or the B-layer PP whichever is lower.

Accordingly, if the B-layer PP has a melting point of at least the above mentioned softening point, the B-layer PP is stretched without melting or flowing at the time of the stretching operation, which is believed to contribute the improvement of the severability by a dispenser cutter.

In general, the optimum stretching temperature of a polypropyylene is usually within a range of about 150° to about 160° C. Therefore, it is advantageous to use a methylpentene polymer having a Vicat softening point within this range and to use a B-layer PP having a melting point of at least the softening point, preferably at least 155° C. and more preferably at least 160° C.

This layer (B) should not substantially contain other polymer or organic or inorganic particles which are not compatible with the B-layer PP.

The polypropylene to be used for the roughened surface layer (C) (hereinafter referred to as "C-layer PP") is preferably the one having a melting point lower than that of the above mentioned A-layer PP and B- layer PP. For instance, a propylene-ethylene copolymer having a melting point of not more than 155° C. is preferred.

In order to firmly bond the adhesive layer to the base sheet, a bonding layer (D) of a carboxylic acid-modified polypropylene is interposed therebetween in the preferred embodiments. The carboxylic acid-modified propylene is prepared by grafting an unsaturated carboxylic acid such as maleic acid or itaconic acid or an unsaturated carboxylic acid anhydride such as maleic acid anhydride to a polymer composed mainly of propylene.

If the carboxylic acid-modified polypropylene is used as the B-layer PP in the structure as shown in FIGS. 3 or 4, this layer may serve also as the layer (D).

With respect to the relative thicknesses of the layers (A) to (D), it is important that the total thickness of the layers (B) and (D), so long as they have a melting point of at least the Vicat softening point of the methylpentene polymer in the layer (A), is within a range of from 5 to 30%, preferably from 10 to 20%, of the total thickness of the layers (A) to (D). Namely, in a case where the carboxylic acid-modified polypropylene of the bonding layer (D) has a melting point of at least the Vicat softening point of the methypentene polymer in the main layer (A), the total thickness of the layers (B) and (D) is within the above range. Whereas, when a carboxylic acid-modified polypropylene having melting point lower than the Vicat softening point of the methylpentene polymer is used as the layer (D), such a layer does not very much contribute to the improvement of the severability by a dispenser cutter, and in such a case, the layer(s) (B) alone should have a thickness within the above range. If the above mentioned total thickness of the layers having a melting point of at least the Vicat softening point of the methylpentene polymer is less than 5%, no adequate improvement of the severability by a dispenser cutter can be attained, i.e. it is impossible to adequately eliminate the drawback that the tape is likely to be torn obliquely when cut by a dispenser cutter. On the other hand, if the total thickness exceeds 30%, the finger-tearability tends to be inferior.

It is believed that the desirable straight transverse severability or tearability is imparted to the layer (B) or layers (B) and (D) by biaxial stretching in both the longitudinal and transverse directions at a temperature of not higher than the melting point thereof, and the severability in the transverse direction thereby imparted compensates the irregular severability or tearability of the layers (A) and (C).

Now, the process for producing the adhesive tape according to the present invention will be described.

Firstly, an adhesive layer is formed on one side of a base sheet of a polypropylene resin and a surface layer of a polypropylene resin containing fine inorganic filler particles is formed on the other side of the base sheet to obtain an unstretched laminated sheet. The polypropylene resin used for the surface layer has a melting point lower than the melting point of the polypropylene resin of the base sheet. Then, the laminated sheet is stretched at a temperature of at least the melting point of the polypropylene resin of the surface layer until the thickness of the surface layer is brought to be not more than the maximum particle diameter of the fine inorganic filler particles.

In the first step, the base layer and the surface layer may advantageously be laminated by co-extrusion or extrusion lamination and then the adhesive material is applied to the base sheet on the side opposite to the surface layer. The adhesive material is preferably an acrylic ester type adhesive material having good adhesion characteristics, and is preferably applied without using any solvent. In this case, it is preferred to preliminarily laminate a carboxylic acid-modified polyolefin layer on the base sheet in order to securely bond the adhesive material to the base sheet. It is advantageous that the carboxylic acid-modified polyolefin layer is co-extruded with the base sheet and the surface layer to form a lamination.

Namely, in a preferred embodiment, a modified polyolefin containing from 0.01 to 10% by weight of an unsaturated carboxylic acid or its derivative is applied to the base sheet to form a bonding layer on the opposite side of the surface layer, and a mixture of an acrylic adhesive having a functional group and a cross-linking agent is applied onto the bonding layer without using any solvent.

The modified polyolefin may be the one obtined by addition-polymerizing or copolymerizing a polyolefin such as polyethylene or polypropylene with from 0.01 to 10% by weight of an unsaturated carboxylic acid such as maleic acid, acrylic acid or itaconic acid, or a dervative of an unsaturated carboxylic acid such as an anhydrous carboxylic acid. If the content of the unsaturated carboxylic acid or its derivative is less than 0.01% by weight, the bonding property of the final adhesive tape will be inferior, and if the content exceeds 10% by weight, the adhesion to a polypropylene-type sheet will be inadequate.

The acrylic adhesive is the one obtained by copolymerizing an acrylic acid ester as the major component with from 0.1 to 15 molar % of a compound having a functional group. As the compound having a functional group, there may be mentioned a carboxylic acid, a carboxylic acid anhydride or a compound having a hydroxyl group such as acrylic acid, methacrylic acid, maleic anhydride or hydroxyethylacrylate. If the compound having a functional group is less than 0.1 molar %, the bonding strength between the adhesive layer and the bonding layer will be inferior, and if the amount exceeds 15 molar %, the adhesion characteristics tend to be inferior.

The molecular weight of the acrylic adhesive to be used in the present invention is preferably within a range of from 250,000 to 700,000 by weight average molecular weight (as measured by gel-permeation chromatography). If the molecular weight is less than 200,000, an adequate adhesion property is not obtainable, and if the molecular weight exceeds 700,000, the application to the base sheet becomes difficult.

The cross-linking agent is a compound having at least two functional groups in its molecule which are reactive with the unsaturated carboxylic acid or its derivative in the modified polyolefin or with the functional groups in the acrylic adhesive, and as such a cross-linking agent there may be mentioned an isocyanate compound, an aziridine compound or an N-methylol compound. Further, a so-called blocked cross-linking agent may also be used in which the functional groups of the above mentioned cross-linking agent are chemically bonded with other compounds and the functional groups will be freed at a high temperature.

In the step of mixing the acrylic adhesive and the cross-linking agent in the absence of a solvent, it is necesary to prevent gelation as far as possible, and by the use of said blocked cross-linking agent, it is possible to readily reduce the gelation to such an extent that the operation can be done without troubles. Further, it is necessary to conduct the mixing at a relatively low temperature and to apply the mixture onto the base sheet as swiftly as possible.

According to the present invention, the adhesive material can be applied initially in a substantial thickness since the thickness of the adhesive material will be thinned in the subsequent stretching step. Accordingly, the above mentioned high viscosity adhesive material which can not otherwise be coated uniformly in a thickness of the usual adhesive layer (e.g. as thin as 20μ) of an adhesive tape, can be readily uniformly coated by a usual fountain-type coater. After coating the adhesive material, the laminated sheet thereby obtained is biaxially stretched by a stretching apparatus at a stretching rate of from 2 to 10 times in the longitudinal direction and from 4 to 10 times in the transverse direction. In a case where the adhesive material is applied to a preliminarily longitudinally stretched sheet, the coated sheet is stretched only in the transverse direction. By this stretching, the thick coating of the high molecular weight adhesive material can be uniformly thinned. Further, if desired, a release treating agent may be applied to the back side of the polypropylene base sheet laminated with the modified polyolefin. This coating is preferably carried out prior to the stretching step.

According to this embodiment, the following superior effects are obtainable:

(1) By the specific modified polyolefin layer interposed between the polypropylene base sheet and the acrylic adhesive material having functional groups, it is possible to obtain an adhesive tape having a good bonding property and in which the modified polyolefin layer and the adhesive material are firmly bonded to each other. This phenomenon is believed to be attributable to the fact that both the modified polyolefin and the adhesive material have functional groups.

(2) After coating the adhesive material on the base sheet, stretching is carried out, and therefore, the adhesive material can be applied in a substantial thickness initially. Accordingly, it is possible to use an acrylic adhesive material having a high molecular weight (namely a high viscosity) which used to be hardly coated without using a solvent, whereby it is possible to obtain an adhesion tape having a good quality.

(3) After coating the adhesive material on the base sheet, stretching is carried out, and accordingly, the base sheet is relatively thick at the time of the application of the adhesive material. During the stretching operation, a constant tension is imparted to the base sheet, whereby it is possible to prevent the shrinkage or the formation of wrinkles on the base sheet, which used to be likely to occur during the application of the adhesive material or during the cross-linking treatment. Further, by the heating at the time of stretching, not only the cross-linking treatment of the adhesive material can be done but also the bonding strength between the modified polyolefin and the adhesive material can be increased.

Referring to FIGS. 2 to 5, an advantageous process for the production of the adhesive tape of the present invention comprises simultaneously extruding the layers (A), (B), (C) and (D) to obtain an unstretched laminated sheet, and after coating an adhesive material thereon, biaxially stretching it at a temperature lower than the melting points of the A-layer PP and the B-layer PP and higher than the melting point of the C-layer PP.

By this process, the layers (A) and (B) are stretched at a temperature lower than their melting points, whereby the strength and severability are imparted thereto. At the same time, in the layer (C), no voids or cracks will be formed at the interface with the inorganic filler particles since the layer (C) is stretched at a temperature higher than the melting point of the C-layer PP, whereby a roughened surface layer having good transparency and superior writability can be formed.

As mentioned above, the stretching is carried out at a temperature lower than the melting point of the polypropylene of the base sheet and higher than the melting point of the propylene copolymer used for the surface layer.

By carrying out the stretching under such conditions, the particle-containing surface layer does not substantially undergo orientation by stretching since the flowability of the propylene copolymer increases at the time of stretching, whereby it is possible to avoid the formation of voids or cracks which are otherwise likely to form at the interface between the propylene copolymer and the fine inorganic filler particles due to the stretching stress. On the other hand, the base sheet is oriented by the stretching, whereby the desired strength and tearability are imparted thereto. Further, it is necessary to set the stretching rate so that the thickness of the particle-containing surface layer after the stretching becomes to be not more than the maximum particle diameter of the fine inorganic particles used. This is intended to minimize the thickness of the particle-containing surface layer to impart good writability without impairing the photostatic property while securing the particles on the flat surface so as not to wholly embed them in the layer.

By controlling the stretching temperature and the thickness of the particle-containing surface layer under such conditions, it is possible to secure the fine inorganic particles to form a flat surface on the roughened surface layer of the final adhesive tape, and to obtain an adhesive tape having good writability and a white surface by virtue of which letters written thereon can easily be read and being free to voids or cracks, thus providing a superior photostatic property with a total percent light transmission of at least 90%.

Now, the invention will be described in further detail with reference to Examples.

EXAMPLE 1

A composition obtained by mixing an isotactic polypropylene having a melt index of 4.0 and a melting point of 167° C. and a methylpentene polymer having a Vicat softening point of 160° C. in a weight ratio of 75:25, was melt extruded to obtain an unstretched sheet. On one side of the unstretched sheet, a particle-containing surface layer obtained by mixing a propylene-ethylene copolymer having a melting point of 155° C. as the component (X), and calcium carbonate having an average particle size of 3μ and a maximum particle size of 10μ as the component (Y) with or without a methylpentene polymer (hereinafter referred to as "PMP"), a polystyrene modified by a carboxylic acid anhydride (hereinafter referred to as "modified PS") or a polymethyl methacrylate (hereinaftere referred to as "PMMA") as the component (Z) in the ratio as shown in Table 1, was laminated by extrusion, while on the other side of the unstretched sheet, a modified polypropylene containing 3% by weight of itaconic acid was simultaneously laminated by extrusion, whereby a three-layer unstretched laminated sheet was obtained. Then, on the modified polypropylene layer side of the unstretched laminated sheet, an acrylic acid ester adhesive material was coated in a thickness of 800μ without using any solvent. Thereafter, the coated laminated sheet was stretched 6 times in the longitudinal direction and 6.7 times in the transverse direction at a strentching temperature of 161° C., and then subjected to heat treatment at a temperature of from 164° to 165° C. for 5 seconds, whereby an adhesive tape having a total thickness of 60μ, was obtained. The roughened surface layer had a thickness as shown in Table 1. The writability, finger-tearability, the photostatic property and the non-glossiness of each adhesive tape thus prepared are shown in Table 1.

The writability was determined by writing on the surface of the tape with pencil having a pencil hardness of 6H and evaluated on the following basis: a readily writable tape was designated by (◎), a more or less hardly writable tape which is considered to be at a practical lower limit level, was designated by (○), and a tape on which writing is almost impossible was designated (Δ).

The photostatic property was determined by measuring the total percent light transmittance of each adhesive tape in accordance with JIS K-6718.

The non-glossiness was determined by measuring the relative-specular glossiness of each adhesive tape with an angle of incidence of 60° in accordance with JIS Z-8741.

than the polypropylene copolymer, it has been found that voids and cracks are likely to form in the roughened surface and they are inferior in the photostatic properties.

Further, from Sample No. 14 wherein a polypropylene having a melting point of 167° C., which is higher than the stretching temperature, was used for the roughened surface layer, it has been found that whitening ocurred due to the formation of voids and cracks and the photostatic property was thereby degraded.

EXAMPLE 2

An unstretched laminated sheet of a thickness of 1600μ having a structure as shown in FIG. 2 was prepared with use of the following materials.

Layer (A):
  Isotactic polypropylene having a melting point of 167° C. (identified as "PP" in Table 2)
  Methylpentene polymer having a Vicat softening point of 160° C. (identified as "PMP" in Table 2)

Layer (B):
  The resins as identified in Table 2

Layer (C):
  Propylene-ethylene random copolymer having an ethylene content of 3% by weight and a melting point of 151° C. . . . 55% by weight
  Calcium carbonate having an average particle size of 3μ . . . 20% by weight
  Methylpentene polymer having a Vicat softening point of 160° C. . . . 25% by weight Layer (D):

TABLE 1

| | Roughened surface layer | | | | | | Photostatic property (Total percent transmittance) | Non-glossiness (Relative-specular glossiness) |
|---|---|---|---|---|---|---|---|---|
| No. | Copolymers* (wt. %) | Calcium carbonate (wt. %) | Thermoplastic resin (wt. %) | Thickness (μ) | Writability | Finger-tearability | | |
| 1 | 70 | 30 | 0 | 2 | ◎ | ◎ | 94 | 45 |
| 2 | 85 | 15 | 0 | 4 | ◎ | ◎ | 95 | 45 |
| 3 | 70 | 30 | 0 | 12 | Δ | ◎ | 85 | 45 |
| 4 | 65 | 30 | PMP 5 | 4 | ◎ | ◎ | 94 | 30 |
| 5 | 50 | 30 | PMP 20 | 4 | ◎ | ◎ | 94 | 10 |
| 6 | 35 | 30 | PMP 35 | 4 | ◎ | ◎ | 94 | 9 |
| 7 | 50 | 30 | PMMA 20 | 4 | ◎ | ◎ | 95 | 12 |
| 8 | 50 | 30 | Modified PS 20 | 4 | ◎ | ◎ | 95 | 11 |
| 9 | 70 | 10 | PMP 20 | 4 | ○ | ◎ | 97 | 15 |
| 10 | 30 | 50 | PMP 20 | 4 | ○ | ◎ | 90 | 7 |
| 11 | 30 | 30 | PMMA 40 | 4 | ○ | ◎ | 85 | 15 |
| 12 | 30 | 30 | Modified PS 40 | 4 | ○ | ◎ | 85 | 15 |
| 13 | 30 | 30 | PMP 40 | 4 | ○ | ◎ | 85 | 15 |
| 14 | PP (m.p. 167° C.) 70 | 30 | 0 | 4 | ◎ | ◎ | 85 | 45 |

*Propylene-ethylene copolymer

From Table 1, it is seen that the adhesive tapes of Samples Nos. 1 and 2 falling within the scope of the present invention are superior in the writability, the finger-tearability and the photostatic property. It is also seen that adhesive tapes of Samples Nos. 4 to 10 falling within the scope of the present invention are superior in the writabililty, the finger-tearability, the photostatic properties and the non-glossiness. In Sample No. 3 wherein the thickness of the roughened surface layer exceeds 10μ i.e. the maximum particle size of calcium carbonate as the fine inorganic filler particles, the finger-tearability is satisfactory, but the writability and the photostatic property are inferior. In Samples Nos. 11 to 13 in which the amount of component (Z) is greater Itaconic acid-grafted polypropylene copolymer having an acid content of 3% by weight and a melting point of 151° C.

On the layer (D) side of the laminated sheet, an acrylic acid ester adhesive material was applied in a thickness of 800μ without using any solvent, and then the coated laminated sheet was biaxially stretched 6 times in the longitudinal direction and 7 times in the transverse direction at a stretching temperature of 161° C., and subjected to further heat treatment at 164° C. for 5 seconds.

In this manner, the adhesive tapes identified by Samples Nos. 4 to 10 in Table 2 were prepared.

The adhesive tapes thus obtained were composed of a layer (C) of 4μ, a layer (A) plus a layer (B) being 35μ, penser severability. The tape which was hardly tearable was designated by (X).

TABLE 2

| | Main Layer (A) | | Layer (B) | | | |
|---|---|---|---|---|---|---|
| No. | PP (wt. %) | PMP (wt. %) | B-layer PP (m.p.) | Thickness ratio (%) | Dispenser severability | Finger-tearability |
| 1 | 100 | 0 | None | 0 | ◎ | X |
| 2 | 95 | 5 | None | 0 | ○ | ○ |
| 3 | 75 | 25 | None | 0 | Δ | ◎ |
| 4 | " | " | Isotactic PP (167° C.) | 3 | Δ | ◎ |
| 5 | " | " | Isotactic PP (167° C.) | 5 | ○ | ◎ |
| 6 | " | " | Isotactic PP (167° C.) | 12 | ◎ | ◎ |
| 7 | " | " | Isotactic PP (167° C.) | 30 | ◎ | ○ |
| 8 | " | " | Isotactic PP (167° C.) | 35 | ◎ | Δ |
| 9 | " | " | Itaconic acid-grafted propylene copolymer (151° C.) | 12 | Δ | ◎ |
| 10 | " | " | Propylene-ethylene copolymer* (162° C.) | 12 | ○ | ◎ |
| 11 | " | " | Itaconic acid-grafted propylene copolymer (165° C.) | 3 | Δ | ◎ |
| 12 | " | " | Itaconic acid-grafted propylene copolymer (165° C.) | 12 | ◎ | ◎ |
| 13 | " | " | Itaconic acid-grafted propylene copolymer (165° C.) | 30 | ◎ | ○ |
| 14 | " | " | Itaconic acid-grafted propylene copolymer (165° C.) | 35 | ◎ | Δ |

*Ethylene content: 0.1% by weight layer (D) of 1μ, and an adhesive layer of 20μ, and the total thickness was 60μ. The ratio of the thickness of the layer (B) to the total thickness of the base sheet (40μ) was as shown in Table 2.

In the same manner as above, adhesive tapes having a structure as shown in FIG. 3 were prepared (Samples Nos. 11 to 14). The same materials as above were used for the layer (A) and the layer (C), and an itaconic acid-grafted polypropylene (acid content: 3% by weight, m.p. 165° C.) was used as the layer (B) which served also as the layer (D). (Namely, in FIG. 3, the same resin was used for the layers (B) and (D).)

The adhesive tapes thus obtained were composed of a layer (C) of 4μ, a layer (A) plus a layer (B) being 36μ, and an adhesive layer of 20μ, and the ratio of the thickness of the layer (B) to the total thickness (40μ) of the base sheet was as shown in Table 2.

Adhesive tapes of Samples Nos. 1 to 3 where the layer (B) was omitted, were prepared in the same manner as above.

The dispenser serverability (i.e. severability by a dispenser cutter), and the finger-tearability of the adhesive tapes thus obtained are shown in Table 2.

For the determination of the dispenser severability, each adhesive tape having a width of 18 mm was used, and with use of a commercially available dispenser having a cutter blade of a thickness of 0.35 mm and with blade tips spaced with a pitch of 1.3 mm, the tape was cut by pulling it at an angle of 20° to the left or the right, and at an angle of 15° relative to the cutter blade.

The cutting was tried 50 times each in the right and left directions, and the tape which was satisfactorily cut without oblique tearing was designated by (◎), the tape was satisfactorily cut with a success rate of at least 80% and thus practically useful, was designated by ((○)) and the tape having a success rate of the proper cutting of less than 80% was designated at (Δ).

The finger-tearability was determined by pinching each adhesive tape having a width of 18 mm, by finger tips of both hands and trying to tear it in the direction of its width without using the finger nails, and after 20 times of the tearing trials, the finger-tearability was evaluated in the same manner as in the case of the dispenser severability. The tape which was hardly tearable was designated by (X).

Each of the tapes Nos. 1 to 14 was superior in its writability by the pencil, photostatic property and nonglossiness. Among them, the products Nos. 5 to 7, 10, 12 and 13 were most satisfactory in both the dispenser severabilty and the finger-tearability.

In Nos. 4 and 11 where the layer (B) was too thin and in No. 9 where the melting point of the B-layer PP was too low, the dispenser severability was not adequately improved but the finger-tearability was superior, and in Nos. 8 and 14 where the layer (B) was too thick, the finger tearability was not so good, but the dispenser severability was good.

Further, it is seen that the tapes No. 1 to 3 where the layer (B) was omitted, were good in either the dispenser severability or the finger-tearability, but not in both.

EXAMPLE 3

A two-layer laminated sheet was prepared by an extrusion lamination method in which a sheet (hereinafter referred to as "PP-type sheet" having a thickness of 1,600μ and prepared by melt mixing 70% by weight of a polypropylene having a limiting viscosity of 1.85 as measured in a tetraline solution at a temperature of 135° C. and an isotactic index of 97% as represented by the component insoluble in n-heptane (boilding point) and a methylphentene polymer having a Vicat softening point of 160° C., was laminated with one of the various modified polyolefins having a thickness of 50μ as shown in Table 3, as a bonding agent. Then, commercially available release treating agent was applied onto the back side of the PP-type sheet in a solid content thickness of 4μ by a roll coater. Further, an adhesive material prepared by mixing at 120° C. an acrylic acid ester polymer (the major component of the adhesive material) having a weight average molecular weight of 440,000 and containing 6 molar % of carboxylic acid groups and, as a cross-linking agent, an isophrone diisocyanate compound blocked with methylethylketooxime (blocked cross-linking agent), was applied immediately after the mixing on the surface of the modified polyolefin layer at a coating temperature of 120°C. in a thickness of 800μ. This laminated sheet was preheated and then stretched at a stretching temperature of 162° C. at a stretching rate of 6 times in the longitudinal direction and 6 times in the transverse direction, and after heat treatment at 165° C. for 5 seconds, it was wound up and aged at 40° C. for one week. Then, it was slit to obtain tapes having a width of 18 mm.

The thickness of each layer of the tape thus obtained was as follows: the PP-type sheet layer of 40μ/the modified polyolefin layer of 1μ/the adhesive layer of 20μ. For the purpose of comparison, an adhesive tape wherein an ethylene-ethylacrylate copolymer (EEA) or a styrene-butadiene-styrene copolymer (SBS) was used instead of the modified polyolefin, and an adhesive tape which was obtained by subjecting a biaxially stretched polypropylene based sheet to corona treatment to imaprt a wet index of 40 dyn/cm (as measured by JIS K-6768) and applying the same adhesive material as in Example 3 in a thickness of 20μ, were prepared.

The bonding properties (Note 1) of the adhesive tapes thus obtained were compared as shown in Table 3.

Note 1: Bonding property: With use of press rollers as stipulated in JIS Z-1522, the tapes were pressed with their adhesive layers face-to-face and left to stand at least one week. Thereafter, they were subjected to a T-type peeling test in an atmosphere of a predetermined temperature (20° C. and 0° C.) under the peeling speed of 300 mm/min, whereupon the rupture states of the peeled surface were observed. The cohesive rupture of the adhesive layer was rated as good (◯). The interfacial rupture between the adhesive layer and the modified polyolefin layer or between the modified polyolefine layer and the PP-type sheet layer, and between the adhesive layer and the PP-type sheet layer, or the rupture of the modified polyolefin itself, was rated as no good (X). Further, a partial interfacial rupture was rated as fair (Δ).

TABLE 3

| Kinds of the bonding agents | (wt. %) | Bonding properties 20° C. | 0° C. |
|---|---|---|---|
| Modified polypropylene, Maleic anhydride | 0.005 | Δ | X |
| Modified polypropylene, Maleic anhydride | 0.01 | ◯ | Δ |
| Modified polypropylene, Itaconic acid | 2 | ◯ | ◯ |
| Modified polypropylene, Acrylic acid | 6 | ◯ | ◯ |
| Modified polyethylene, Acrylic acid | 10 | ◯ | Δ |
| Modified polyethylene, Acrylic acid | 20 | Δ | X |
| Ethylene-ethylacrylate copolymer (EEA) | | ◯ | X |
| Styrene-butadiene-styrene copolymer (SBS) | | ◯ | X |
| Corona treated product* | | Δ | X |

*When the adhesive material was coated, the biaxially stretched polypropylene sheet underwent shrinkage and wrinkles were formed.

From Table 3, it is seen that the tapes wherein modified polyolefins containing from 0.01 to 10% by weight of the unsaturated carboxylic acid or its derivative, have good bonding properties.

It is also seen that the tapes wherein the acrylic acid ester adhesive material was applied via the ethylene-ethylacrylate copolymer (EEA) or the styrene-butadiene-styrene copolymer (SBS) have inferior bonding properties at low temperatures.

Further, the corona treated product of the biaxially stretched polypropylene sheet has an inferior bonding property, and it is seen that wrinkles are formed by the application of the adhesive material.

EXAMPLE 4

The same PP-type sheet of a thickness of 1,600μ as used in Example 3 was used, and a modified polypropylene containing 2% by weight of itaconic acid and having a thickness of 50μ was laminated by extrusion to form a two-layer laminated sheet. Then on the back surface of the PP-type sheet, a release treating agent was coated on a thickness of 4μ, and then an adhesive material prepared by mixing one of acrylic acid ester polymers (the major component of the adhesive material) having various weight average molecular weights as shown in Table 4 and containing 6 molar % of carboxylic acid groups and the same blocked cross-linking agent as used in Example 3 at 120° C., was applied immediately after the mixing on the surface of the modified polyolefin layer at a coating temperature of 120° C. in a thickness of 800μ. Thereafter, the laminated sheet was subjected to the same stretching, heat treatment and aging treatment as in Example 3, and then slit to form tapes. The tapes thereby obtained had superior bonding properties ( ) at 20° C. and 0° C). A high molecular weight acryl adhesive material which used to be hardly applicable without using a solvent, can evenly be applied in a uniform thickness without leading to shrinkage or formation of wrinkles. The holding forces (Note 2) and the peeling characteristics (Note 3) of the adhesive tapes are shown in Table 4.

Note 2: Holding force: In accordance with JIS Z-1524, a sample having a tape width of 18 mm of a sticking fringe of 20 mm was stuck on a stainless steel and left to stand at room temperature for 24 hours. Thereafter, a static load of 1 kg was put on it in a hot air drier at 40° C. and the holding force was represented by the time required for the sample to fall. In a case where the time for falling exceeded 2 hours, the holding force was represented by the length of the displacement upon expiration of 2 hours.

Note 3: Cohesiveness: In accordance with JIS Z-1522, a tape of a width of 18 mm was press-fixed on a stainless steel sheet and left to stand at room temperature for 24 hours. Thereafter, it was peeled in an atmosphere of 20° C. ×65% PH at a peeling speed of 300 mm/min at 180°, and the rupture state of the peeled surface was observed. A case where no cohesive rupture i.e. no adhesive residue was observed on the stainless steel sheet, was rated as good (◎), and a case where the adhesive remained partially was rated as fair (◯).

TABLE 4

| No. | Weight average molecular weights of acrylic acid ester polymers* | Holding forces | Cohesiveness |
|---|---|---|---|
| 1 | 180,000 | 100 minutes | ◎ |
| 2 | 250,000 | At most 0.1 mm | ◎ |
| 3 | 440,000 | At most 0.1 mm | ◎ |
| 4 | 600,000 | At most 0.1 mm | ◎ |

*They were measured by the gel permeation chromatograph (GPC) method.

As described in the foregoing, the present invention provides an adhesive tape having superior writability, finger-tearability, dispenser severability, photographic property, non-glossiness and bonding property and a process for its production, and is extremely useful for application to a mending adhesive tape. The present invention is also applicable to processes for the production of adhesive sheets or labels.

I claim:

1. An adhesive tape comprising a base sheet of a polypropylene resin, an adhesive layer formed on one side of the base sheet and a roughened surface layer formed on the other side of the base sheet and composed of from 25-85% by weight of a polypropylene resin (X) having a melting point lower than that of said base sheet resin, from 10 to 50% by weight of fine inorganic filler particles (Y) and from 5-45% by weight of one or more resins (Z) selected from the group consisting of a methylpenetene polymer, a polystyrene, a polyalkyl methacrylate and a polyester, provided that the total of the components (X), (Y) and (Z) is always 100% by weight and the amount of the component (Z) is not more than the amount of the component (X), and the relative specular glossiness of the roughened surface layer is not more than 30%, characterized in that said roughened surface layer has a thickness of not more than the maximum particle diameter of said fine inorganic filler particles and is substantially free from voids and cracks, and the total percent light transmittance of the adhesive tape is at least 90%.

2. The adhesive tape according to claim 1 wherein the base sheet comprises a main layer composed of from 95 to 50% by weight of a polypropylene and from 5 to 50% by weight of a methylpenetene polymer.

3. The adhesive tape according to claim 1 wherein the base sheet comprises a main layer (A) composed of from 95 to 50% by weight of a polypropylene and from 5 to 50% by weight of a methylpentene polymer and a subsidiary layer (B) formed on one side or each side of the main layer (A) and composed of a crystalline polypropylene having a melting point of at least the Vicat softening point of said methylpentene polymer, and a bonding layer (D) of a carboxylic acid-modified polypropylene is interposed between the base sheet and the adhesive layer.

4. The adhesive tape according to claim 3 wherein the carboxylic acid-modified polypropylene of the bonding layer (D) has a melting point of at least the Vicat softening point of the methylpentene polymer in the main layer (A), and the total thickness of the layers (B) and (D) is within a range of from 5 to 30% of the total thickness of the layers (A), (B) and (D) and the roughened surface layer.

5. The adhesive tape according to claim 3 wherein the carboxylic acid-modified polypropylene of the bonding layer (D) has a melting point of less than the Vicat softening point of the methylpentene polymer in the main layer (A) and the thickness of the layer (B) is within a range of from 5 to 30% of the total thickness of the layers (A), (B) and (D) and the roughened surface layer.

6. The adhesive tape according to any one of claims 1, 3, 4 and 5 wherein the inorganic filler particles having a maximum particle diameter of about $10\mu$ and are capable of forming a roughened surface having a maximum roughness of at most $10\mu$, an average roughness of from 2.0 to $6.0\mu$.

7. The adhesive tape according to any one of claims 1, 3, 4 and 5 wherein the adhesive layer is composed of an acrylic adhesive obtained by copolymerizing an acrylic acid ester with from 0.1 to 15 molar % of a carboxylic acid, a carboxylic acid anhydride, or a hydroxyacrylate.

8. The adhesive tape according to claim 1 wherein the polypropylene resin of the roughened surface layer has a melting point lower than the melting point of the polypropylene resin of the base sheet and composed of a propylene-ethylene copolymer having a melting point of not more than 155° C.

* * * * *